(12) United States Patent
Daniels

(10) Patent No.: US 11,640,560 B2
(45) Date of Patent: *May 2, 2023

(54) AUTOMATED TRAINING DATA QUALITY PROCESS

(71) Applicant: Lytx, Inc., San Diego, CA (US)

(72) Inventor: Jesse Daniels, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/227,175

(22) Filed: Apr. 9, 2021

(65) Prior Publication Data

US 2021/0232864 A1 Jul. 29, 2021

Related U.S. Application Data

(63) Continuation of application No. 16/450,671, filed on Jun. 24, 2019, now Pat. No. 11,010,640.

(51) Int. Cl.
| | |
|---|---|
| *G06V 20/56* | (2022.01) |
| *G06V 10/774* | (2022.01) |
| *G06K 9/62* | (2022.01) |
| *G06F 16/23* | (2019.01) |
| *G06N 20/00* | (2019.01) |
| *G06V 20/59* | (2022.01) |
| *G06V 10/44* | (2022.01) |

(52) U.S. Cl.
CPC ....... *G06K 9/6256* (2013.01); *G06F 16/2379* (2019.01); *G06K 9/6262* (2013.01); *G06K 9/6265* (2013.01); *G06N 20/00* (2019.01); *G06V 10/454* (2022.01); *G06V 10/774* (2022.01); *G06V 20/56* (2022.01); *G06V 20/593* (2022.01)

(58) Field of Classification Search
CPC .... G06V 10/70; G06V 10/766; G06V 10/774; G06V 10/776; G06V 10/7796; G06V 20/56; G06V 20/58; G06V 20/582; G06V 20/584; G06V 20/588; G06V 20/59; G06V 20/597; G06T 2207/20081; G06T 2207/30248; G06T 2207/30252; G06T 2207/30256; G06T 2207/30261; G06T 2207/30268; G06N 20/00

See application file for complete search history.

(56) References Cited

U.S. PATENT DOCUMENTS

| | | | |
|---|---|---|---|
| 11,010,640 B1 * | 5/2021 | Daniels | G06V 20/593 |
| 2019/0102656 A1 | 4/2019 | Kwant et al. | |
| 2019/0205794 A1 | 7/2019 | Hsu et al. | |
| 2020/0272938 A1 | 8/2020 | Desmond et al. | |

* cited by examiner

*Primary Examiner* — Andrew W Johns

(74) *Attorney, Agent, or Firm* — Van Pelt, Yi & James LLP

(57) ABSTRACT

A system for updating training data includes an interface and a processor. The interface is configured to receive a set of vehicle data. The set of vehicle data includes images and assigned labels associated with the images. The processor is configured to determine a set of training data and a set of test data from the set of vehicle data; train a model with the set of training data; determine a set of predicted labels for the set of vehicle data using the model; identify a set of potential mislabeled data using the set of predicted labels and the assigned labels; and determine an updated set of training data by relabeling the set of potential mislabeled data and replacing the set of potential mislabeled data with a relabeled set of data.

12 Claims, 11 Drawing Sheets

AUTOMATED TRAINING DATA QUALITY PROCESS

CROSS REFERENCE TO OTHER APPLICATIONS

This application is a continuation of U.S. patent application Ser. No. 16/450,671 entitled AUTOMATED TRAINING DATA QUALITY PROCESS filed Jun. 24, 2019 which is incorporated herein by reference for all purposes.

BACKGROUND OF THE INVENTION

Modern transportation vehicles (e.g., airplanes, boats, trains, cars, trucks, etc.) often include a vehicle event recorder to support driver safety, operational safety, and operational productivity. A vehicle event recorder typically includes a set of sensors (e.g., video recorders, accelerometers, global positioning system sensors, etc.) that report data that can be analyzed to classify events such as driver distractions and related safety concerns (e.g., cell phone use, eating, drinking, smoking, not looking ahead, not wearing seat belt, etc.). Human analysis of such data can be tedious, inefficient, inaccurate, and costly. While the use of machine-learning models can alleviate many of these issues, the datasets used to train the models are often based on increasingly large numbers of human-labeled examples (e.g., many millions) that inevitably contain classification and labeling errors. This creates a problem as how to efficiently and cost-effectively find and correct such errors in the training data to improving overall dataset quality and model performance.

BRIEF DESCRIPTION OF THE DRAWINGS

Various embodiments of the invention are disclosed in the following detailed description and the accompanying drawings.

DETAILED DESCRIPTION

Figure 1:
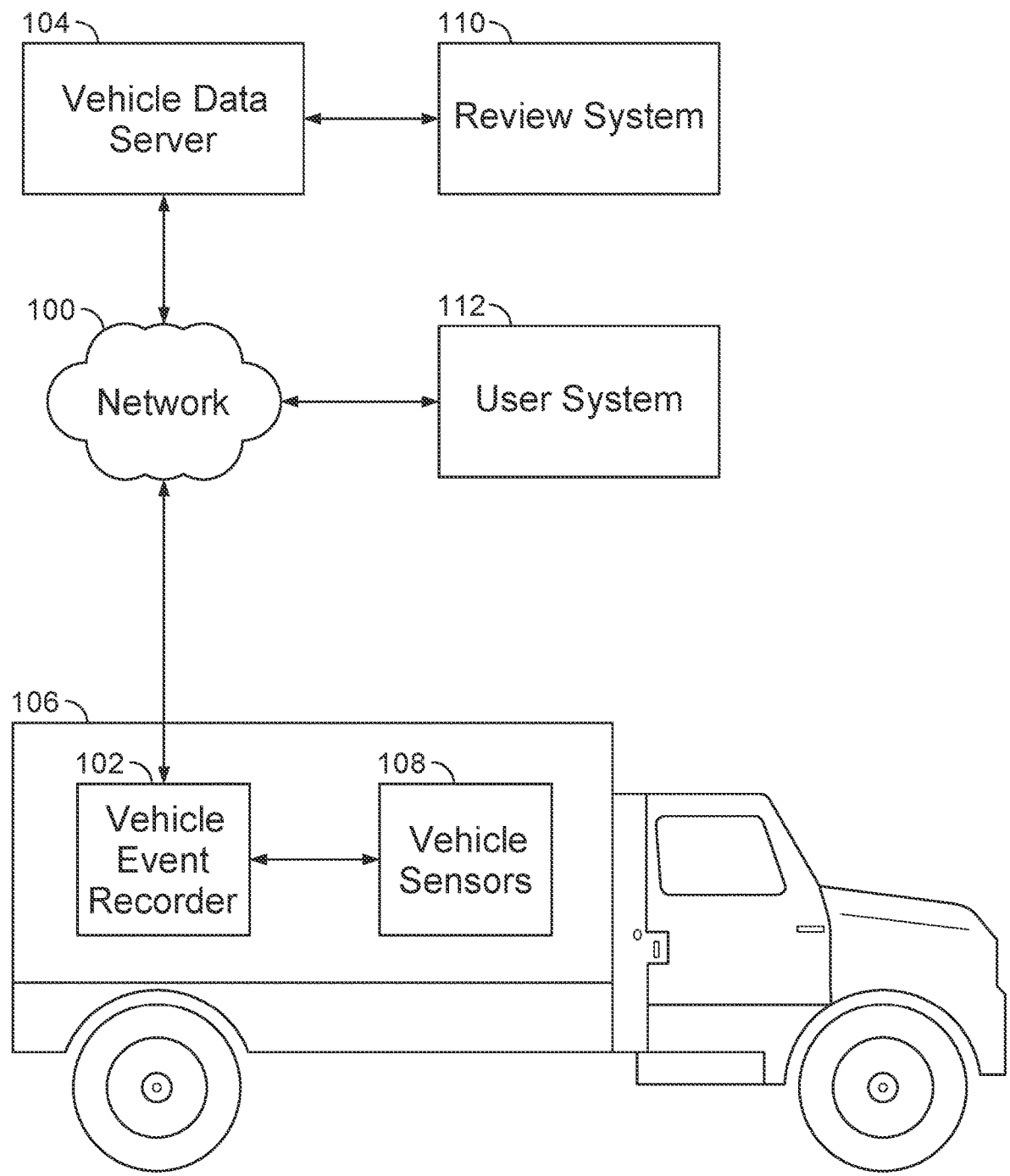
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for updating training data is disclosed. The system comprises an interface and a processor. The interface is configured to receive a set of vehicle data. The set of vehicle data includes images and assigned labels associated with the images. The processor is configured to determine a set of training data and a set of test data from the set of vehicle data; train a model with the set of training data; determine a set of predicted labels for the set of vehicle data using the model; identify a set of potential mislabeled data using the set of predicted labels and the assigned labels; and determine an updated set of training data by relabeling the set of potential mislabeled data and replacing the set of potential mislabeled data with a relabeled set of data. In some embodiments, the processor is further configured to retrain the model using the updated set of training data.

In some embodiments, the system further comprises a memory and/or user interface that is/are coupled to the processor and configured to provide the processor with instructions.

A vehicle event recorder is able to record sensor data both internal and external to a vehicle. The sensor data can be used to determine events related to a driver that characterize the driver's performance while operating the vehicle. The events can be related to external events—for example, how the driver interacts with the road (e.g., hard braking, speeding, frequent lane changes, etc.), with traffic (e.g., following too close, collision, speed mismatch, etc.), with obstacles on the road (e.g., hitting or missing a pot hole, etc.), with pedestrians (e.g., slowing or stopping for a pedestrian, hitting a pedestrian, etc.), etc. The events can also be related to internal events—for example, what the driver's behavior is while driving (e.g., paying attention, being distracted, being tired, smoking, using a cell phone, eating, etc.). For an employer employing drivers (e.g., a business that has a fleet of delivery or service vehicles), it is desirable to understand both internal and external events during the operation of a vehicle in their fleet. Typically, the sensor data from an event recorder is reviewed by reviewers (e.g., a human reviewer) and is annotated with labels that identify, describe, classify, and/or otherwise characterize the events in the sensor data. These labels can then be provided to the employer directly or analyzed (e.g., statistics generated, flags or warnings generated, etc.) and the analysis results provided to the employer.

For hundreds of thousands of vehicle event recorders and thousands of events per vehicle, the amount of event data that needs labeling numbers in the tens or hundreds of millions of instances. In addition, each event may be associated with a plurality of labels leading to a large data set. One solution to making the overall system more efficient is to automate the labeling; the model can automate labeling to help make labeling more cost effective and more time efficient. However, models are not yet perfect just as the human labels are not always perfect. The system disclosed addresses these shortcomings.

A model is trained using an existing labeled set of event data. The model is then run on the data to identify labels in the set that may have been mislabeled. These labels are then relabeled to improve quality and then these labels are placed back into the data set for updating the model, where training on the improved data set improves the quality of the model. The updated model is measured to make sure that it is operating at a level that is sufficient (e.g., above a threshold for an operating level, typically 0.5-0.6 confidence or higher for the correct class out of 1.0). This process can be repeated to keep the model up to date as well as keeping the labeled data set well curated. Also, on an ongoing basis, the identification of suspect labels as labeled by the model (e.g., labels with low confidence) can be used to redirect events to be relabeled by human labelers on a more targeted basis leading to improvements in their relabeling skills as well as increasing cost-effectiveness by reducing the amount of data that requires, or may benefit from, human analysis.

This system improves a labeling process by making it more efficient. The system is faster by being able to utilize a model for labeling. The system is higher in quality because it identifies events that need relabeling to improve the model training set. This improved model training set further improves the model labeling performance. The system is more cost effective and faster as labeling can be performed using the model. And the system is more accurate as relabeling resources are used more strategically for those labels that are identified as problematic by the training and testing the model.

The system for an automated process to improve training data includes one or more vehicle event recorders, a communication network, a vehicle data server, one or more processors, a labeling model, and a database. The vehicle event recorder records video of the vehicle driver and the driver's local proximity. The vehicle event recorder transmits the video via the communication network to the vehicle data server's interface for archival storage in the vehicle data server's database. Over long periods of time (e.g., years) and utilizing multiple vehicle event recorders (e.g., hundreds of thousands), large amounts of archived video data events (e.g., millions) are analyzed, classified, and labeled by human reviewers. A large portion (e.g., 80%) of the human-labeled event data is used to train and improve the performance of the labeling model. A smaller portion (e.g., 20%) of the labeled event data is used to perform a test of the model.

The vehicle data server processor comprises a model trainer, a remote labeling model (i.e., remote from the vehicle event recorder), and a training data updater. In some embodiments, the updated labeling model is utilized locally within the vehicle event recorder to mitigate the costs and time involved in transferring large amounts of video data from the local vehicle event recorder to the remote vehicle data server. The disclosed system for updating training data is also an improvement over human-updated labeling by virtue of its improved accuracy, speed, and cost-effectiveness.

In some embodiments, determining the set of training data comprises determining a filtered set of training data from the set of vehicle data and determining the set of training data from the filtered set of training data. In some embodiments, the filtered set of training data comprises the set of training data filtered based at least in part on whether image quality is above an image quality threshold. Image quality can be measured as having the correct number of video frames, no corruption in the video (e.g., a video decoder can successfully decode the video). In some embodiments, the image quality threshold comprises an uncompressed image quality threshold (e.g., determining that there is a correct number of frames, that the video can be properly decoded, that the frames are I-frames, etc.). In some embodiments, the filtered set of training data comprises the set of training data filtered based at least in part on whether a driver seating position corresponds to right-side road driving. In some embodiments, the filtered set of training data comprises the set of training data filtered based at least in part on whether date of training data is within a date range. In some embodiments, the preprocessed set of training data comprises the filtered set of training data decimated to a fixed number of frames. In some embodiments, the fixed number of frames is set to using a specific number of frames per second. In some embodiments, the fixed number of frames is set to a specific number of reference I-frames. In some embodiments, the preprocessed set of training data comprises the filtered set of training data cropped to a driver location portion of an image. In some embodiments, the preprocessed set of training data comprises the filtered set of training data cropped to a driver location portion of an image and resized to a model input image size. In some embodiments, the preprocessed set of training data comprises the filtered set of training data normalized to a data value range.

FIG. 1 is a block diagram illustrating an embodiment of a system including a vehicle event recorder. In the example shown, when vehicle 106 travels, vehicle event recorder 102 and vehicle sensors 108 capture sensor data (e.g., audio/video data, global positioning system data, accelerometer data, braking data, lane data, etc.). The sensor data is measured or received by vehicle event recorder 102. Vehicle event recorder 102 uses the data to determine events (e.g., collision events, hazardous maneuver events, distracted driving events, etc.). For example, when the vehicle event recorder 102 determines an event (e.g., a lane departure event), it begins a process for identifying whether an inappropriate driving behavior is associated with the event. This association can be used to determine whether the event was potentially caused by an inappropriate driving behavior. For example, it may be determined that the driver departed the lane because of distraction from talking on a cell phone.

Vehicle event recorder 102 comprises a vehicle event recorder mounted in a vehicle (e.g., a car or truck). Vehicle event recorder 102 has its own sensors and is also in communication with vehicle sensors 108. Vehicle event recorder 102 sensors comprise a set of sensors—for example, an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. Vehicle sensors 108 comprise a set of sensors—for example, a speedometer, an accelerator pedal sensor, a brake pedal sensor, an engine revolution per minute (RPM) sensor, an engine temperature sensor, a headlight sensor, an airbag deployment sensor, driver and passenger seat weight sensors, an anti-locking brake sensor, an engine exhaust sensor, a gear position sensor, a turn signal sensor, a cabin equipment operation sensor, or any other appropriate vehicle state sensors.

Vehicle event recorder 102 comprises a system for receiving and processing sensor data (e.g., A/V data). Processing sensor data comprises filtering data, identifying patterns in data, detecting events, etc. Vehicle event recorder 102 is mounted on vehicle 106 in any appropriate location—for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear-view mirror) and more space is required to house electronic components.

Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost, etc.). In some embodiments, network 100 has a different cost at different times (e.g., a higher cost during the day and a lower cost at night). Vehicle event recorder 102 communicates with vehicle data server 104 via network 100.

Vehicle event data collected by vehicle event recorder 102 is sent to vehicle data server 104. In some embodiments, vehicle event data in the form of A/V data is recorded on vehicle event recorder 102 as full-resolution uncompressed video. In some embodiments, A/V event data is made available for download to vehicle data server 104 in both uncompressed full-resolution and compressed lower-resolution formats. In various embodiments, the format type for download to vehicle data server 104 is determined in part by considering the cost of the available methods of transmission. For example, transmission of large amounts of video data via a cellular data network while the vehicle is en route can be much more costly than using a local Wi-Fi service at select vehicle stopping points. Transmission of lower-resolution video en route provides more timely access to event data than high-resolution data access limited to select vehicle stopping points (e.g., that may occur only once or twice a day). Transmission of full-resolution video is useful over longer time periods to provide high quality video event data useful as training and test data to improve model performance.

Vehicle data server 104 transmits received vehicle event data to review system 110 so that the data can be reviewed by a first set of reviewers (e.g., a set of human reviewers). The reviewers annotate the events in the vehicle event data with labels that identify, describe, classify, and/or otherwise characterize the events. The labeled event data is used to provide statistics and monitoring information to user system 112.

In order to develop an improved system, the labeled event data is used to develop a model. The labeled event data is used to train a model. The model can then be used to identify suspect labels (e.g., events that have been potentially mislabeled or mischaracterized by the first set of reviewers). These suspect labels are then used to improve the labeled event data by submitting the corresponding events for relabeling (e.g., by providing them to review system 110 for review by a second set of reviewers). In some embodiments, the second set of reviewers is of higher quality than the first set of reviewers (e.g., more experienced, given a narrower more-focused set of classifications, allowed more time for analysis, etc.).

The relabeled event data is then merged back into the labeled event data set (e.g., by tracking the events labeled suspect using an identifier, relabeling the event associated with the identifier, and reinserting the relabeled events back into the training or testing data sets using the identifier). The relabeled event data is then used to create and test an updated and improved model.

The training, update, and test process is iterated until the model error shows a performance improvement less than a threshold improvement compared to a last iteration (e.g., 10%, 5%, 2%, 1%, etc.) or a predefined number of iterations is reached. A typical metric for determining performance is average precision for each class in the model. In some embodiments, the finalized model is run by vehicle data server 104 to label new event data received from vehicle event recorder 102. In some embodiments, a local labeling model is generated to run on vehicle event recorder 102. The local labeling model comprises a version tailored for the processor and/or memory of vehicle event recorder 102 (e.g., a less processor intensive version and/or less memory intensive version). In some embodiments, the local labeling model is the same as the finalized model.

In some embodiments, the local labeling model in vehicle event recorder 102 is used to label new events received via vehicle sensors 108. In some embodiments, the video event data used by the local labeling model is lower-resolution compressed video to limit demand on the processor in vehicle event recorder 102 (e.g., the vehicle event recorder processor is much less powerful than a processor that can be incorporated into vehicle data server 104). In some embodiments, the labeling model that resides in vehicle data server 104 (i.e., a remote labeling model) utilizes a more powerful processor to analyze and benefit from full-resolution uncompressed video and serve as a quality check on the event labeling done by the local labeling model. In some embodiments, the remote labeling model can be used to augment or replace a first set of reviewers used to label the training and test data.

Figure 2:
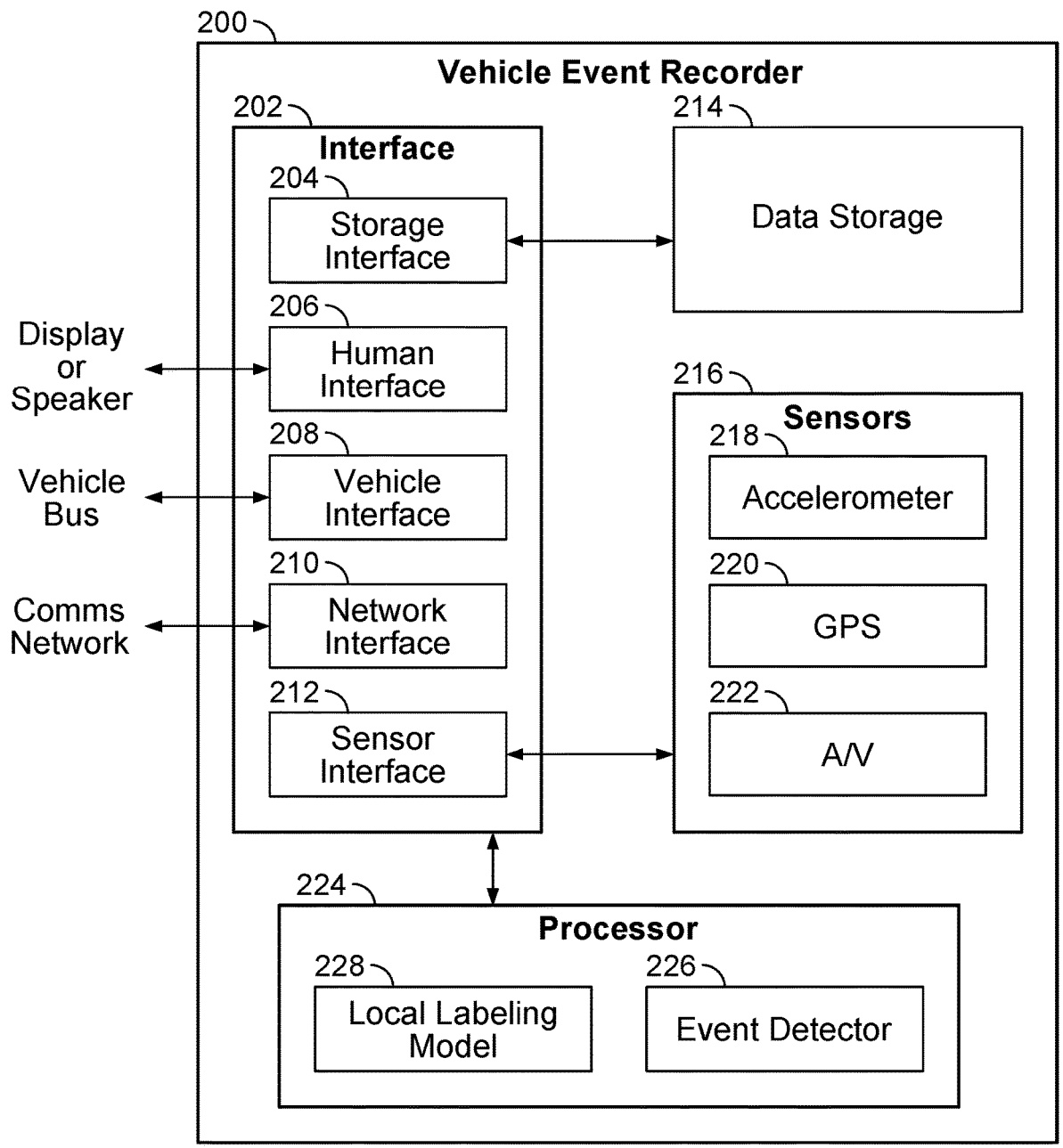
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 is used to implement vehicle event recorder 102 of FIG. 1. In the example shown, vehicle event recorder 200 monitors sensor signals from internal sensors 216 (e.g., accelerometer 218, GPS sensor 220, A/V sensor 222) or from vehicle sensors via vehicle interface 208.

Vehicle event recorder 200 communicates with a vehicle data server using network interface 210 (e.g., using a wired or wireless network such as a WiFi™ or cellular network). Vehicle event recorder 200 transmits sensor data, vehicle data, vehicle identification data, anomalous event data, driver quality data, etc. to the vehicle data server. Vehicle event recorder 200 comprises interface 202. Interface 202 comprises a set of interfaces to other systems. Human interface 206 comprises an interface to a human interaction system—for example, an audio output (e.g., a speaker), a display output, a haptic output, etc. Sensor interface 212 comprises an interface to one or more sensors for receiving sensor data. Sensor interface 212 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, or any other appropriate sensors. Vehicle interface 208 interfaces with vehicle state sensors possibly including a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, vehicle interface 208 comprises a connection to a vehicle bus such as an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Vehicle interface 208 further comprises an interface to one or more vehicle systems (e.g., for adjusting vehicle control parameters, for putting the vehicle in a safe mode, etc.). Network interface 210 comprises a network interface for communicating with other systems via a network. Network interface 210 comprises one or more of a GSM interface, a CDMA interface, an LTE interface, a WiFi interface, an Ethernet interface, a Universal Serial Bus (USB) interface, a Bluetooth™ interface, an Internet interface, etc. Processor 224 comprises a processor for controlling the operations of vehicle event recorder 200, for reading and writing information on data storage 214, for reading and/or writing data via storage interface 204, etc. Processor 224 also comprises event detector 226 for determining events (e.g., collision events, hazardous maneuver events, distracted driving events, etc.) and local labeling model 228 for classifying and labeling the determined events (e.g., cell phone use, eating, drinking, smoking, not looking ahead, not wearing seat belt, etc.). In some embodiments, local labeling model 228 comprises a model determined using training data to label video event recorder event data, where the training data was prior collected event data that was labeled and used to generate a labeling model for the vehicle data server and/or vehicle event recorder 200. Event detector 226 is used to detect events and flag or mark an index for received A/V clips or within the continuous stream(s) of A/V data.

Data storage 214 comprises a data storage (e.g., a random-access memory (RAM), a read only memory (ROM), a nonvolatile memory, a flash memory, a hard disk, or any other appropriate data storage). Data storage 214 stores clips or continuous stream(s) of audio/video data from A/V 222. Data storage 214 comprises a data storage for storing instructions for processor 224, vehicle event recorder data, vehicle event data, sensor data, A/V data, driver scores, vehicle information, vehicle identifying information, anomalous event information, driver quality information, bad behavior indications, etc.

Processor 224, after utilizing local labeling model 228 to label events from A/V clips or streams, routes the labeled event data to data storage 214 for later retrieval at select vehicle stopping points, and/or compresses the A/V clips or streams for transmission to the vehicle data server via interface 202. Network interface 210 is used to receive updates to local labeling model 228 as it is trained, updated, and improved as described in this disclosure.

Figure 3:
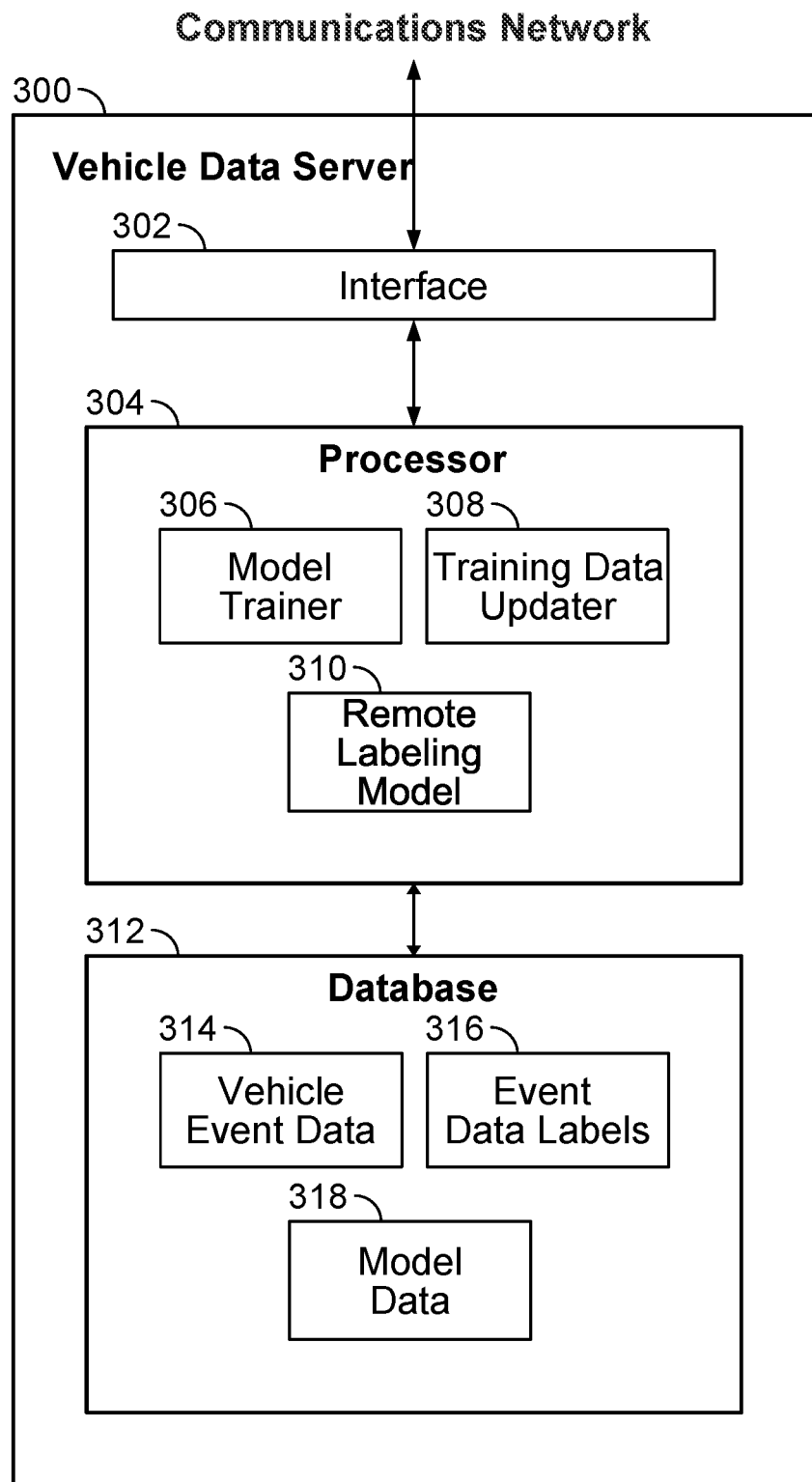
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 receives vehicle data information via a communications network using interface 302, including vehicle event data, sensor data, vehicle information, and raw data associated with a vehicle with a mounted vehicle event recorder. Received vehicle event data is stored in vehicle event data 314 of database 312.

In various embodiments, received vehicle event data is filtered and categorized for various criteria—for example, what vehicle event recorder it came from, the date recorded, the quality of video, which side of vehicle the driver is on (e.g., left side or right side based on geographic region), etc. In various embodiments, the vehicle event data is further processed into a form suitable for efficiently training the model—for example, reducing the number of video frames to be analyzed (e.g., reducing 30 frames per second to 1 frame per second), cropping frames to focus on the driver area, normalizing pixel values within each saved frame, etc. In some embodiments, a full resolution uncompressed set of one or more frames is taken periodically (e.g., capturing and saving 10 consecutive I-frames) to be used as reference frames (also known as keyframes).

In various embodiments, video images, clips, and/or streams comprising vehicle event data comprise various color bit depths (e.g., 16, 24, 32, 48-bit color, etc.), monochrome color (e.g., black and white, greyscale, or coloring that utilizes different shades of a single color, etc.), video resolution (e.g., 480, 720, 1080, 4K, 8K, etc.), and be compressed (e.g., using any useful coding standard(s) of the various Joint Photographic Experts Group (JPEG), Moving Picture Experts Group (MPEG), International Telecommunication Union (ITU) standards, or any other appropriate coding standard) or uncompressed full-frame video stored at the native frame rates and resolution of A/V 222.

In various embodiments, raw, filtered, categorized, and/or otherwise processed vehicle event data is sent to a first set of reviewers (e.g., a human reviewer) to be annotated with labels that identify, describe, classify, and/or otherwise characterize the events in the vehicle event data. After first reviewer labeling, the determined event data labels and associated vehicle event data are transmitted via interface 302 for storage in database 312. A large portion (e.g., 80%) of the reviewer-labeled event data is set aside to train a labeling model using model trainer 306 as run using processor 304 (e.g., by randomly selecting and marking reviewer-labeled video events as training data). A smaller portion (e.g., 20%) of the labeled event data is set aside to perform testing by model trainer 306.

Model trainer 306 builds a model by training a machine learning model, a neural network, or any other appropriate model. Model trainer 306 builds the model utilizing vehicle event data stored in vehicle event data 314 and associated event data labels stored in event data labels 316.

In some embodiments, model trainer 306 performs its training and then periodically tests at a plurality of check points (e.g., testing after training every N events or M seconds of training), and determines a test score for each of the check points. In some embodiments, training is continued until the test performance on class precision recall shows less than a threshold percentage improvement (e.g., 10%, 5%, 2%, 1%, etc.). Once the test performance reaches a reasonable maximum, model trainer 306 defines a remote labeling model that is executed as remote labeling model 310. In various embodiments, processor 304 provides vehicle event data to model trainer in batches (e.g., tens or hundreds of event clips), and/or shuffles and reorders data (e.g., randomly) while training and testing the model to avoid systematic errors when fitting the model output to the assigned labels. Database 312 stores model data in model data 318 defining and/or used by a model as being determined by model trainer 306 or executed as remote labeling model 310 (e.g., check point frames, updated weights, etc.).

In order to refine the accuracy of and/or improve the quality of the training data, training data updater 308 executes the remote labeling model on the training data set and the test data set. The model error is assessed by comparing model-generated labels (i.e., predicted labels) for each event to the respective labels labeled by the first set of reviewers (i.e., assigned labels). Model error is analyzed for two types of errors: (i) predicted labels that have a probability level greater than a first confidence level and the predicted label is different from its reviewer-assigned label and (ii) predicted labels that have a probability level less than a second confidence level and the predicted label is identical to its reviewer-assigned label. The events associated with the two types of errors are identified and marked in the database stored set of training data and set of test data. These identified and marked events are submitted for relabeling. In some embodiments, the second set of reviewers is not provided with the model-predicted label(s) or original first-reviewer labels(s) so as not to bias the relabeling process. In some embodiments, the second set of reviewers is of higher quality than the first set of reviewers (e.g., more experienced, given a narrower more-focused set of classifications, allowed more time for analysis, etc.). Training data updater 308 receives the relabeled events and updates the associated original data in the database stored set of training data and set of test data.

After training data updater 308 has updated the set of training data and the set of test data, model trainer 306 repeats generation of the model using the updated set of training data and the updated set of test data. The process of training data updating and model updating is repeated until the rate of improvement is less than a percentage amount (e.g., 10%, 5%, 2%, 1%, etc.) or a predefined number of iterations (e.g., 10, 5, 3, etc.) is reached. The model as now having been refined is stored in model data 318 and is used for executing the model as part of remote labeling model 310.

The finalized remote labeling model is executed by remote labeling model 310 to analyze event data received from a vehicle event recorder and label the events automatically. These automatic labels can be used to provide a user with statistics, analysis, and/or information related to incoming identified events from a user's fleet of vehicles.

In some embodiments, a local labeling model is determined from the finalized remote labeling model and provided to a vehicle event recorder in order to enable labeling local to the vehicle event recorder by executing the local labeling model on event data collected by the vehicle event recorder.

In some embodiments, labels generated at the vehicle event recorder are checked using confidence levels and/or probabilities associated with the label, and the labels are indicated for relabeling in the event that the confidence level and/or probability is below a threshold for relabeling (e.g., a threshold of 0.6, 0.5, 0.4, 0.3, etc.).

In some embodiments, labels generated locally at the vehicle event recorder (e.g., using the local labeling model) can be checked by running the event data at the server (e.g., using the remote labeling model), and an event can be indicated for relabeling when the event is 1) labeled differently by the two models, 2) labeled with a confidence below a confidence threshold by the remote labeling model (e.g., a threshold of 0.6, 0.5, 0.4, 0.3, etc.), or 3) labeled with a confidence below another confidence threshold (e.g., a threshold of 0.6, 0.5, 0.4, 0.3, etc.) by the local labeling model, or any other appropriate relabeling criterion. In some embodiments, these indicated events for relabeling are relabeled and then stored in the data set database to maintain quality of labels in the database.

In some embodiments, the history of labels and their relabeling is stored for audit purposes along with the version of the model that produced each label.

Figure 4A:
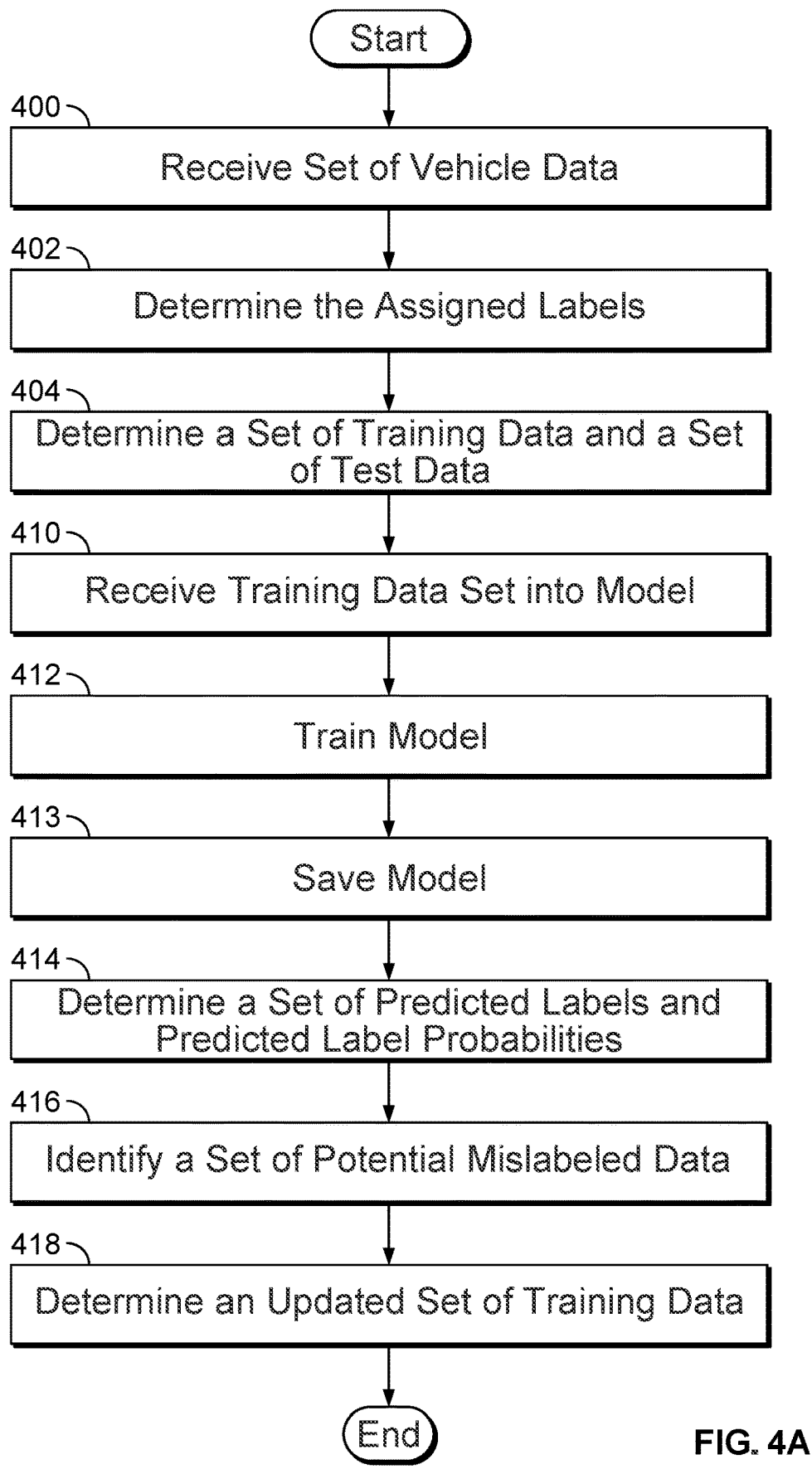
FIG. 4A is a flow diagram illustrating an embodiment of a process for determining an updated set of training data.

FIG. 4A is a flow diagram illustrating an embodiment of a process for determining an updated set of training data. In some embodiments, the process of FIG. 4A is executed by a vehicle data server (e.g., vehicle data server 300 of FIG. 3). In the example shown, in 400, a set of vehicle data is received. For example, a set of vehicle data is received from a vehicle event recorder at the vehicle data server, where event data includes video frames from a video camera. The vehicle data is stored in storage of a vehicle data server. In 402, assigned labels are determined. For example, event data is sent to a review system for review and labeling. In some embodiments, a reviewer (e.g., a human reviewer) views the event data and selects one or more labels and assigns the labels to the event data. In 404, a set of training data and a set of test data from the set of vehicle data is determined. For example, a vehicle data server determines a segmentation of event data and corresponding labels into a set of training data and a set of test data. In various embodiments, the computer program determines which portions of the vehicle data set to be marked as training data or marked as test data in a random fashion, by analyzing and sorting the labeled events to include in each of the two data sets a representative proportion of all label types present in the entire set of vehicle event data, or any other appropriate manner of sorting. In some embodiments, the percentage of the entire set of vehicle event data to be marked as training data is adjustable (e.g., 50%, 60%, 70%, 80%, or any other suitable percentage that is shown to most effectively and efficiently train the model).

In 410, the training data set is received into the model. For example, the event data is preprocessed (e.g., filtering, cropping, decimating, etc.) and presented to the inputs of the model as well as the desired labels. In 412, the model is trained. For example, the model is trained using a subset of the training data and then tested and that training is repeated using another subset of the data until the model error difference between iterations is less than a percentage improvement (e.g., 10%, 5%, 2%, 1%, etc.) or a predefined number of iterations is reached. In 413, the model is saved. For example, the model is stored in a database of the vehicle data server. In 414, a set of predicted labels and predicted label probabilities are determined. For example, the model is run on the training set and the test set and the probabilities and/or confidence levels are determined for the members of the data set. In 416, a set of potential mislabeled data is identified. For example, mislabeled data is determined using one or more criteria. In some embodiments, the potential mislabeled data is determined by (i) if the predicted label probabilities are at a level greater than a first confidence level and the predicted label is different from its reviewer-assigned label; or (ii), if the predicted label probabilities are at a level less than a second confidence level and the predicted label is identical to its reviewer-assigned label. In 418, an updated set of training data is determined. For example, events that have been identified as mislabeled are used to determine an updated set of training data—for example, by sending the mislabeled events for analysis and relabeling by one or more reviewer(s), and by merging the data back into the data set associated with the event. In some embodiments, the one or more reviewer(s) is/are not provided with the model-predicted label(s) or the original assigned labels(s) so as not to bias the relabeling process.

Figure 4B:
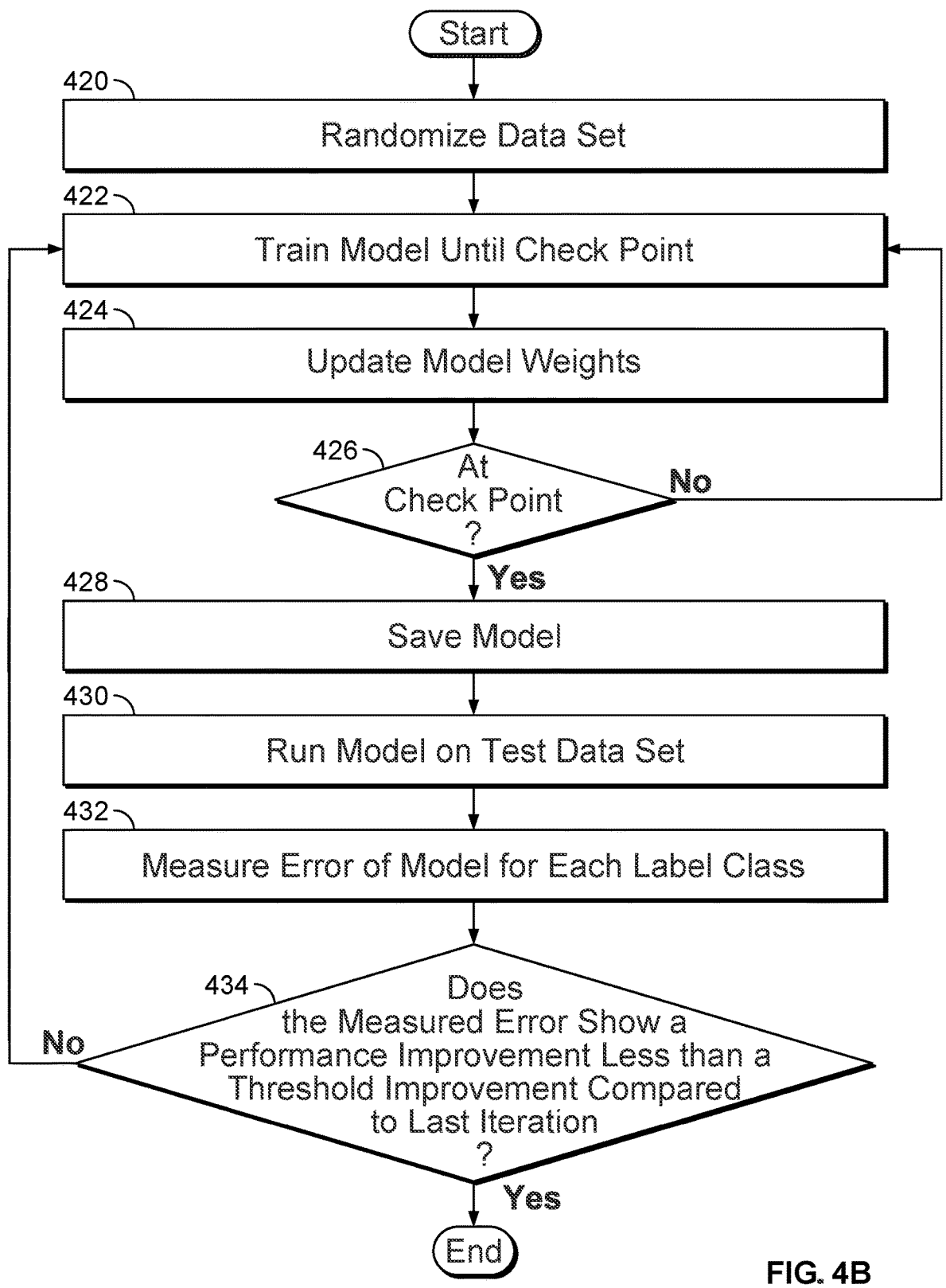
FIG. 4B is a flow diagram illustrating an embodiment of a process for training and testing a model.

FIG. 4B is a flow diagram illustrating an embodiment of a process for training and testing a model. In some embodiments, the process of FIG. 4B is executed by a vehicle data server processor (e.g., vehicle data server processor 304 of FIG. 3). In the example shown, in 420, a data set is randomized. For example, a training data set of labeled vehicle events is ordered in a random fashion in preparation for training the model. In 422, the model is trained until a check point. For example, the model is trained on a set of N events. As the event data is presented, the model weights are generated to best match the reviewer assigned labels of the training data set. In 424, the model weights are updated. For example, the updated weights are saved. In 426, determine whether at check point. In response to not being at the check point, control passes to 422. In response to being at the check point, control passes to 428. In 428, the model is saved. For example, the model at the check point is saved. In 430, the model is run on the test data set. For example, the saved model is run on the test set of data to provide a metric of goodness of fit for the model. In 432, model error is measured for each label class. For example, the model error is indicated for each of the labels associated with an event and statistics are compiled related to each of the labels over the training data set. In 434, it is determined whether the difference in measured error is less than a threshold percentage improvement between iterations (e.g., 10%, 5%, 2%, 1%, etc.) or a predefined number of iterations (e.g., 3, 4, 5, 6, etc.) is reached. In response to the measured error showing a performance improvement less than a threshold improvement compared to the last iteration, the process ends. In response to the measured error not showing a performance improvement less than a threshold improvement compared to the last iteration, control passes to 422.

Figure 4C:
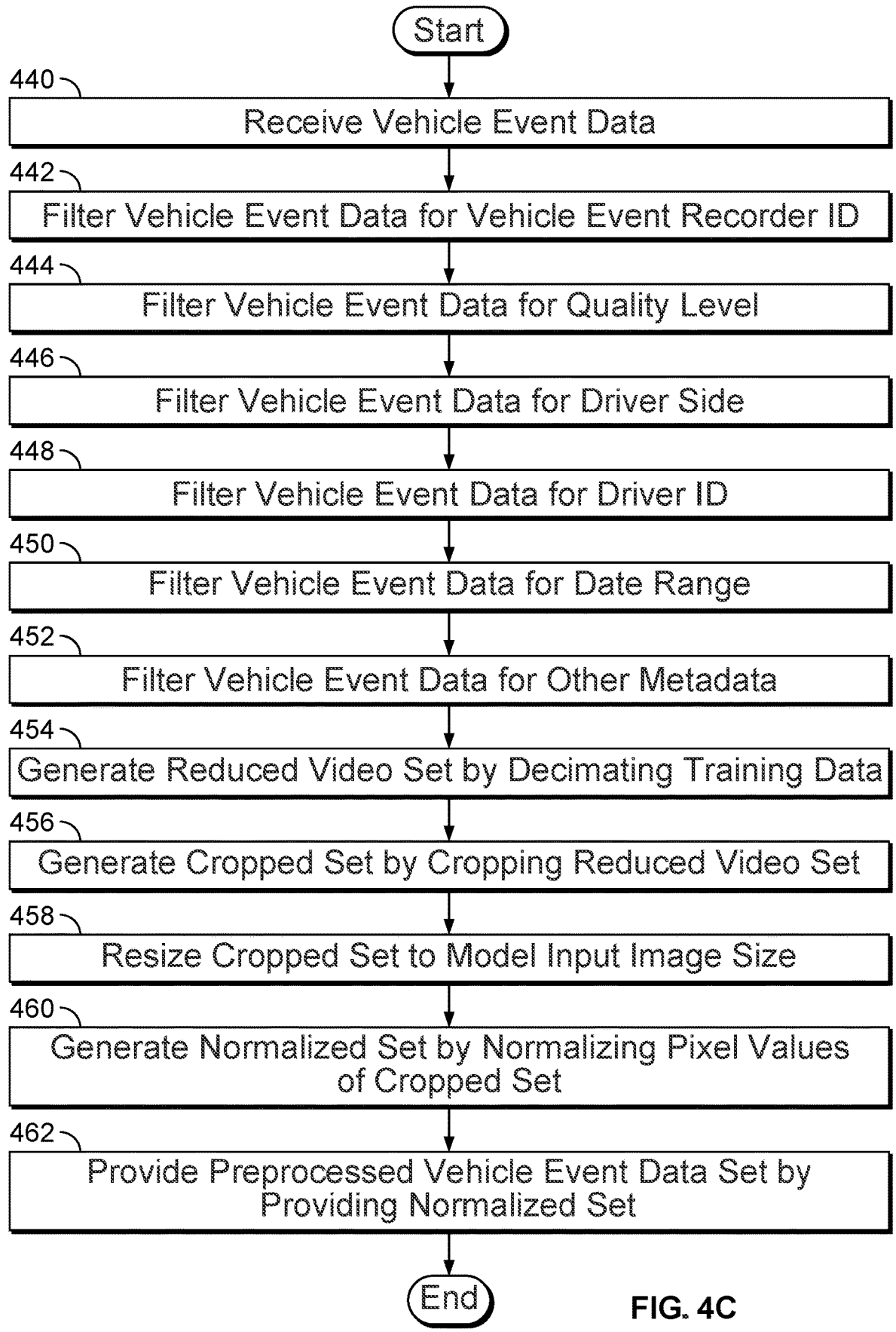
FIG. 4C is a flow diagram illustrating an embodiment of a process for pre-processing vehicle event data.

FIG. 4C is a flow diagram illustrating an embodiment of a process for pre-processing vehicle event data. In some embodiments, the process of FIG. 4C is executed by a vehicle data server processor (e.g., vehicle data server processor 304 of FIG. 3). In various embodiments, the process of FIG. 4C is used to pre-process vehicle event data that includes training data, test data, updated training data, and/or updated test data (e.g., data received in 400 in FIG. 4A, 410 in FIG. 4B, 500 in FIG. 5, 600 in FIG. 6, 700 in FIG. 7A, and/or 720 in FIG. 7B). In the example shown, in 440, vehicle event data is received. In 442, vehicle event data is filtered for vehicle event recorder ID. For example, vehicle event data is filtered for a vehicle event recorder ID by serial number or any other appropriate means of identification in order to determine whether the camera resolution is sufficient, processor power is sufficient, memory availability is sufficient, etc. for automated label processing. In 444, vehicle event data is filtered for quality level, for example, vehicle event data is filtered for quality level such that video events have sufficient number of pixels (e.g., 512×512, 256×256, 299×299, 224×224, etc.). In some embodiments, the video quality level is determined by a pixel size of the frame, a bit rate for compression, or any other appropriate measure of video quality. In 446, vehicle event data is filtered for driver side. For example, the event data is selected to only include data such that the driver is sitting on the left side of the vehicle. In various embodiments, driver side is specified corresponding to left or right-side road driving. In 448, vehicle event data is filtered for driver ID. For example, the drivers for the events are selected using a set of driver IDs, a set of badge number, a set of facial recognition parameters, or by any other appropriate means of identification. In 450, vehicle event data is filtered for date range. For example, a set of events is selected for being recent (e.g., within the last year, month, quarter, day, etc.), within a range of dates, within a time window during the date (e.g., during daylight, during night time, during first shift, during swing shift, etc.), during holidays, during weekdays, during weekends, or any other appropriate time associated criteria. In 452, vehicle event data is filtered for other metadata. For example, the event data is filtered for type of vehicle, type of fleet, geographic location, rural classification, urban classification, client type, or using any other appropriate metadata associated with an event. In 454, a reduced video set is generated by decimating training data. For example, event video data is reduced to a number of frames associated with an event. In some embodiments, the N frames are selected for each event within a time window of M seconds. In some embodiments, a reference frame is selected for each second of 10 seconds of an event. In 456, a cropped set is generated by cropping the reduced video set. For example, the cropped set is generated by cropping video frames to the immediate proximity of the driver such as within in a fixed 299×299 pixel window within a frame or any other appropriate region of interest. In 458, the cropped set is resized to model input image size. For example, the fixed window of the cropped image is rescaled to an input image size for the label model. In some embodiments, the label model has an input image size of 224×224 pixels. In 460, a normalized set is generated by normalizing pixel values of the cropped set. For example, each pixel value of the input image to the label model is put within a fixed value of ranges (e.g., between −1 and 1, between 0 and 255, etc.). In various embodiments, normalizing pixel values includes centering the pixel values, for example, by global or local centering methods. In various embodiments, pixel centering occurs before or after pixel normalization. In some embodiments, image cropping is performed prior to normalization. In 462, the preprocessed training data set is provided by providing the normalized set. For example, the output image as preprocessed by the steps of FIG. 4C is provided as output of this process.

Figure 5A:
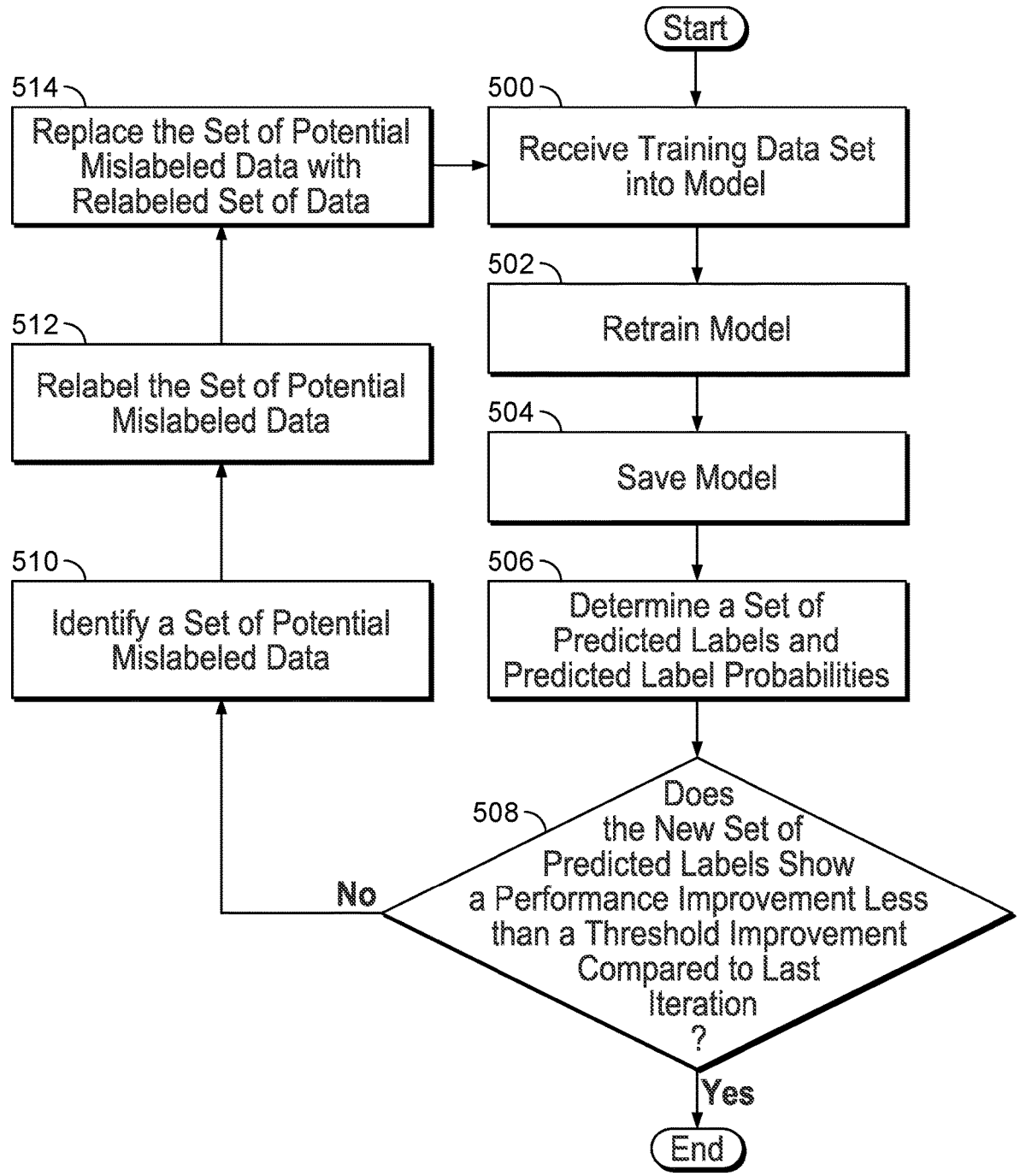
FIG. 5A is a flow diagram illustrating an embodiment of a process for retraining a model and assessing improvement.

FIG. 5A is a flow diagram illustrating an embodiment of a process for retraining a model and assessing improvement. In some embodiments, the process of FIG. 5A is executed by a vehicle data server processor (e.g., vehicle data server processor 304 of FIG. 3) in coordination with one or more reviewers. In the example shown, in 500, the training data set is received into the model. In 502, the model is retrained. For example, the model is retrained using a subset of the training data and then tested and that training is repeated using another subset of the data until the model error shows decreasing improvement, e.g., flattens out. In 504, the model is saved. For example, the model is stored in a database of the vehicle data server. In 506, a set of predicted labels and predicted label probabilities are determined. For example, the model is run on the training set and the test set and the probabilities and/or confidence levels are determined for the members of the data set. In 508, it is determined whether the new set of predicted labels shows a performance improvement less than a threshold improvement compared to a last iteration. In response to the new set of predicted labels showing a performance improvement less than a threshold improvement compared to a last iteration, the process ends. In response to the new set of predicted labels not showing a performance improvement less than a threshold improvement compared to a last iteration, control passes to 510. In 510, a set of potential mislabeled data is identified. For example, mislabeled data is determined using one or more criteria. In some embodiments, the potential mislabeled data is determined by (i) if the predicted label probabilities are at a level greater than a first confidence level and the predicted label is different from its reviewer-assigned label; or (ii), if the predicted label probabilities are at a level less than a second confidence level and the predicted label is identical to its reviewer-assigned label. In 512, the set of potential mislabeled data is relabeled. For example, the identified set of mislabeled data is sent to be relabeled using human reviewers. In some embodiments, the reviewer(s) is/are not provided with the model-predicted label(s) or original assigned labels(s) so as not to bias the relabeling process. In 514, the set of potential mislabeled data is replaced with the relabeled set of data. For example, the mislabeled data is placed in the data set and control passes to 500. For example, the data set is improved and the model is retrained using the updated training data set.

Figure 5B:
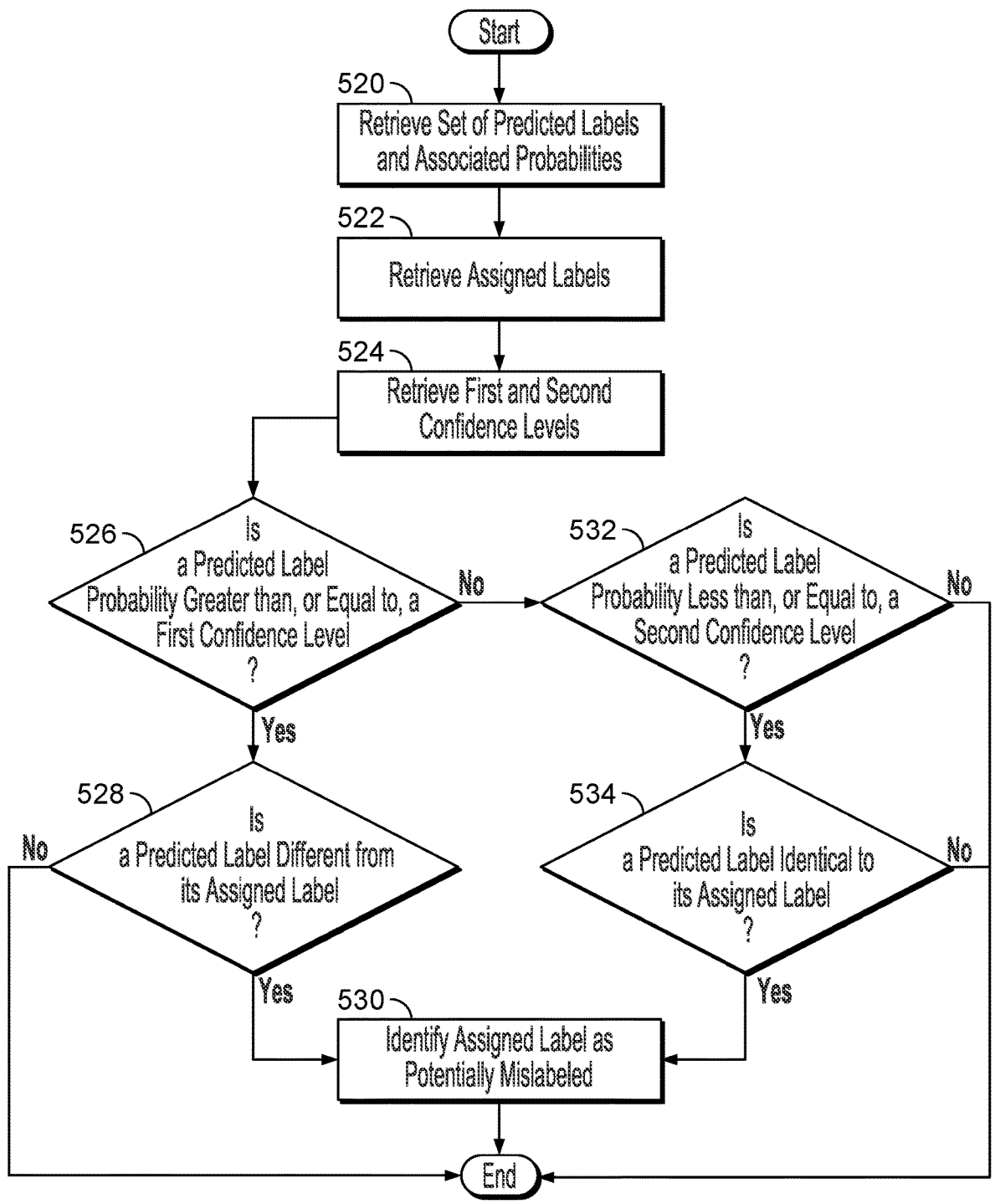
FIG. 5B is a flow diagram illustrating an embodiment of a process for identifying potentially mislabeled events.

FIG. 5B is a flow diagram illustrating an embodiment of a process for identifying potentially mislabeled events. In some embodiments, the process of FIG. 5B is executed by a vehicle data server processor (e.g., vehicle data server processor 304 of FIG. 3). In some embodiments, the process of FIG. 5B is used to implement 416 of FIG. 4A or 510 of FIG. 5A. In the example shown, in 520, a set of predicted labels and associated probabilities is retrieved. For example, the set of predicted labels and associated probabilities is retrieved from processor memory or from the vehicle data server database. The predicted labels and associated probabilities are the output of processes described above for training, testing, and running the model on various iterations of the training and test data. In 522, the assigned labels are retrieved. For example, the original assigned labels from a first set of reviewers or an updated set of assigned labels by a second set of reviewers are retrieved from processor memory or from the vehicle data server database. In 524, the first and second confidence levels are retrieved. For example, the first and second confidence levels are retrieved from the vehicle data server database, where the first and the second confidence levels are such that above a first confidence level, the predicted label is deemed reliable and likely, while below a second confidence level, the predicted label is deemed unreliable and unlikely. In 526, it is determined whether a predicted label probability is greater than, or equal to, a first confidence level. In response to the predicted label probability being greater than, or equal to, a first confidence level, then control passes to 528. In response to the predicted label probability not being greater than, or equal to, a first confidence level, then control passes to 532.

In 528, it is determined whether a predicted label is different from its assigned label. In response to the predicted label being different from its assigned label, control passes to 530. In response to the predicted label not being different from its assigned label, the process ends.

In 532, it is determined whether a predicted label probability is less than, or equal to, a second confidence level. In response to the predicted label probability being less than, or equal to, a second confidence level, then control passes to 534. In response to the predicted label probability not being less than, or equal to, a second confidence level, then the process ends. In 534, it is determined whether a predicted label is identical to its assigned label. In response to the predicted label being identical to its assigned label, then control passes to 530. In response to the predicted label not being identical to its assigned label, then then the process ends.

Figure 6:
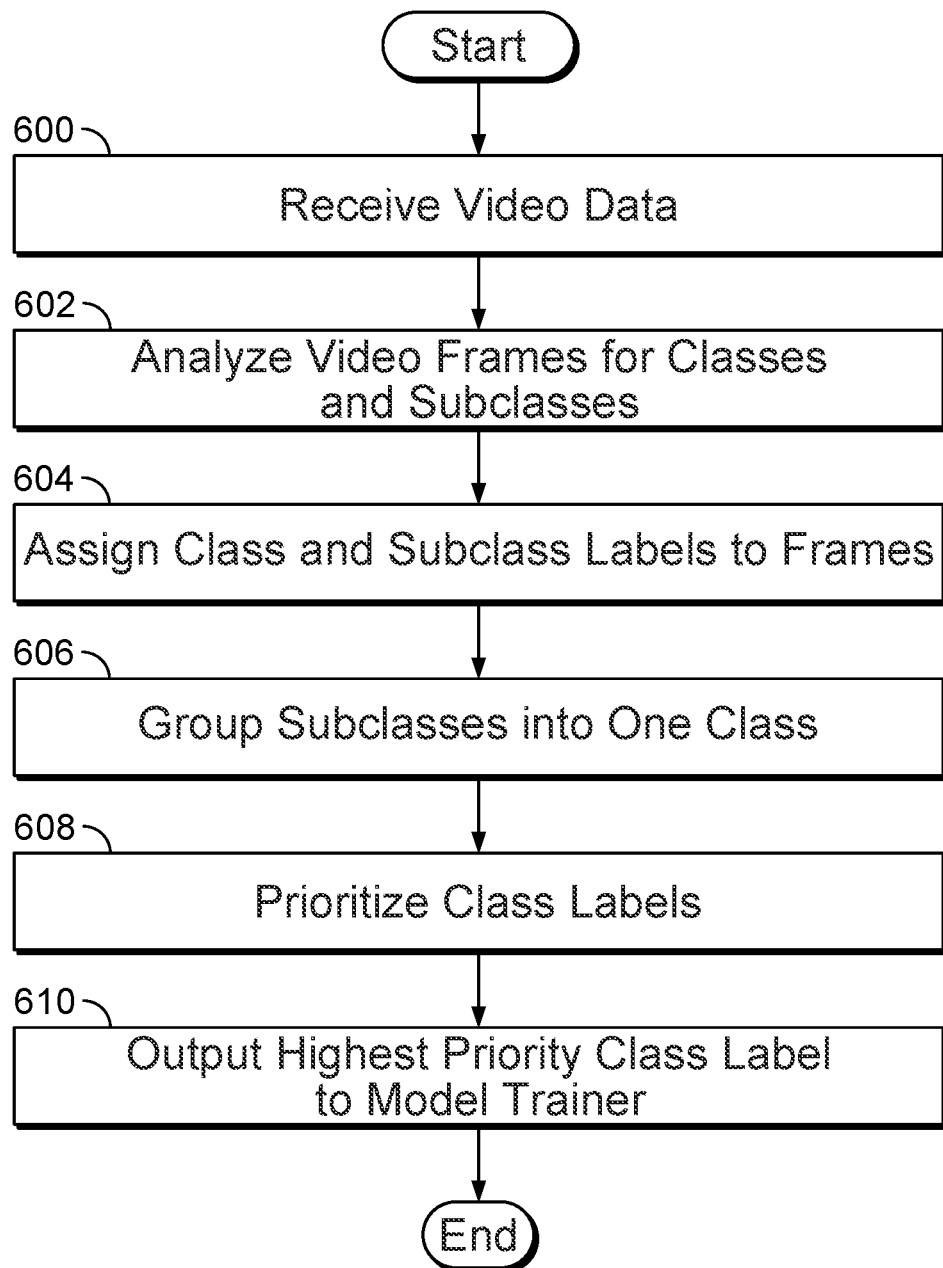
FIG. 6 is a flow diagram illustrating an embodiment of a process for labeling events.

FIG. 6 is a flow diagram illustrating an embodiment of a process for labeling events. In some embodiments, the process of FIG. 6 is executed by a vehicle data server processor (e.g., vehicle data server processor 304 of FIG. 3) and/or by a set of reviewers (e.g., a first or second set of reviewers). In some embodiments, the process of FIG. 6 is used to implement 402 of FIG. 4A or 512 of FIG. 5A. In the example shown, in 600, video data is received. For example, video data associated with vehicle events is received (e.g., from a vehicle event recorder or as stored in a video data server after having been received from a vehicle event recorder). In 602, video frames are analyzed for classes and subclasses. For example, classes comprise events classified—for example, as driver distractions and safety concerns (e.g., cell phone use, eating, drinking, smoking, not looking ahead, not wearing seat belt, etc.). Subclasses comprise events that share a common class (e.g., cell phone use, eating, drinking, and smoking are all subclasses of a driver distraction class; not looking ahead and not wearing a seat belt are subclasses of a driver safety class; etc.). In 604, class and subclass labels are assigned to frames. For example, class and subclass labels are assigned to video frames, where the video frames originate from a video recording clip of a vehicle event. In 606, subclasses are grouped into one class. For example, the subclasses are grouped into a common class. In some embodiments, common classes are labeled based only on the highest priority concern (e.g., to improve efficiency of the model training). For example, in response to cell phone use being a greater concern than eating or drinking and all three subclasses of distraction events are observed in an event, the class is labeled as a cell phone distraction and the other distraction subclass labels are ignored.

In 608, class labels are prioritized. For example, class labels are prioritized based on a user configurable and pre-determined set of class rules and/or based on a particular client's concerns. In some embodiments, a safety violation (e.g., not looking ahead or not wearing a seat belt) may be considered a higher priority concern than a driver distraction (e.g., taking a sip of water or a bite from an energy bar, etc.). In 610, the highest priority class label is output. For example, the highest priority class label is output as the label associated with an event. In some embodiments, a ranked list of labels is output associated with an event.

Figure 7A:
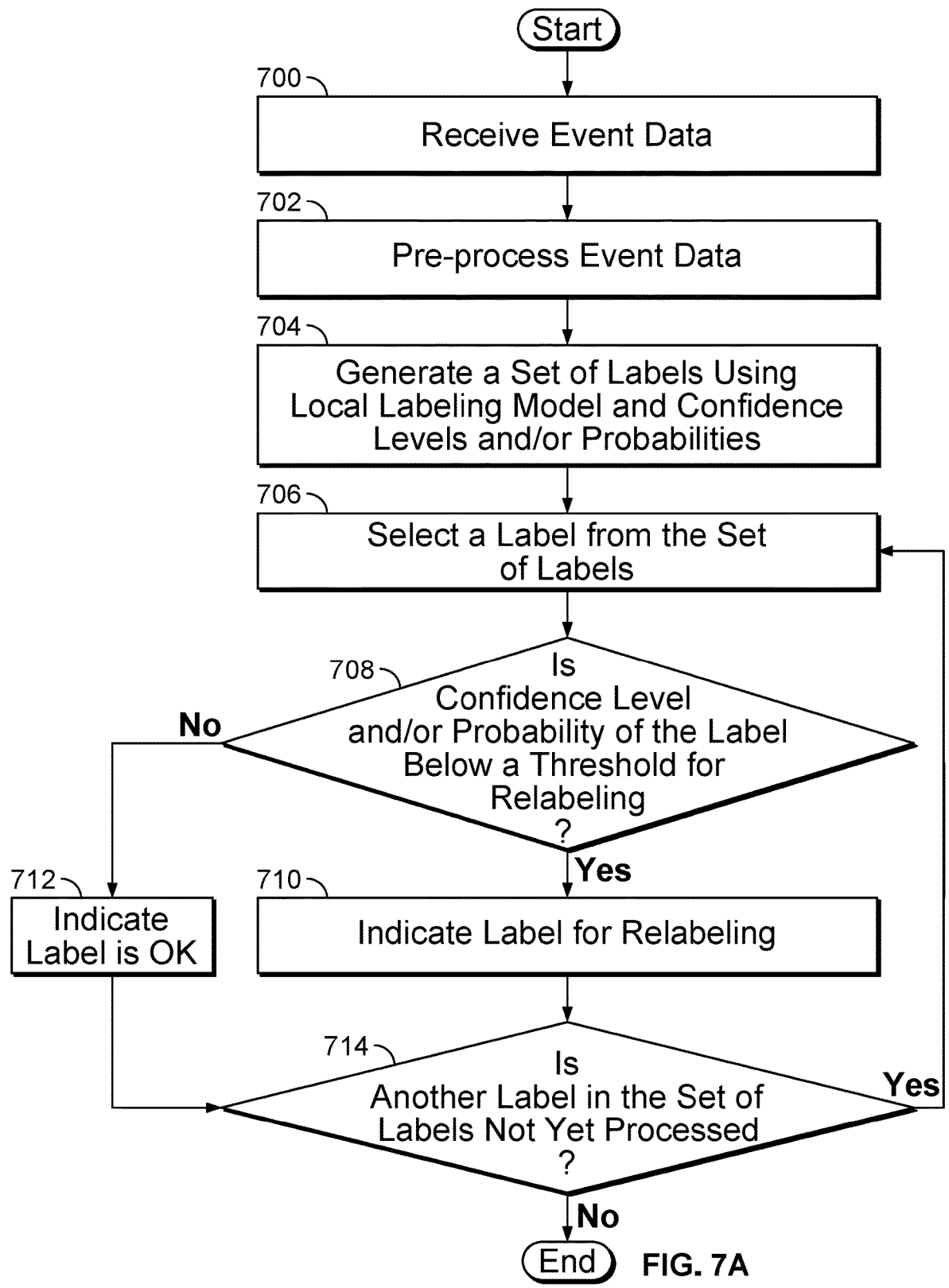
FIG. 7A is a flow diagram illustrating an embodiment of a process for relabeling a label locally at a vehicle event recorder.

FIG. 7A is a flow diagram illustrating an embodiment of a process for relabeling a label locally at a vehicle event recorder. In some embodiments, the process of FIG. 7A is executed by a vehicle event recorder processor (e.g., vehicle event recorder processor 224 of FIG. 2). In the example shown, in 700, event data is received. For example, video data associated with vehicle events is received. In 702, event data is pre-processed. For example, video data is filtered, decimated, cropped, resized, and/or normalized. In some embodiments, video data is filtered for vehicle event recorder identity, quality level, driver side, driver identity, date range, etc. In 704, a set of labels is generated using a local labeling model and confidence levels and/or probabilities. For example, a set of labels is generated using a labeling model resident in the vehicle event recorder and confidence levels and/or probabilities for each label in the set of labels are also generated (e.g., by the vehicle event recorder processor). In 706, a label is selected from the set of labels. For example, a label that classifies a vehicle event for driver behavior is selected. In 708, it is determined whether a confidence level and/or probability of the label is below a threshold for relabeling (e.g., 0.6, 0.5, 0.4, 0.3, etc.). For example, it is determined whether the label characterizing a driver's behavior is deemed unreliable and unlikely based on a confidence threshold associated with the local labeling model. In response to the confidence level and/or probability of the label being below a threshold for relabeling, in 710, the label is indicated for relabeling. For example, the video event associated with the label (e.g., the video frames from a video clip that has recorded a vehicle event) is marked with an index or other appropriate fiducial marking to indicate to a set of reviewers that the event associated with the label is in need of review. In response to the confidence level and/or probability of the label not being below a threshold for relabeling, in 712, the label is indicated as OK. In 714, it is determined whether there is another label in the set of labels not yet processed. In response to there being another label in the set of labels not yet processed, control passes to 706. In response to there not being another label in the set of labels not yet processed, the process ends.

Figure 7B:
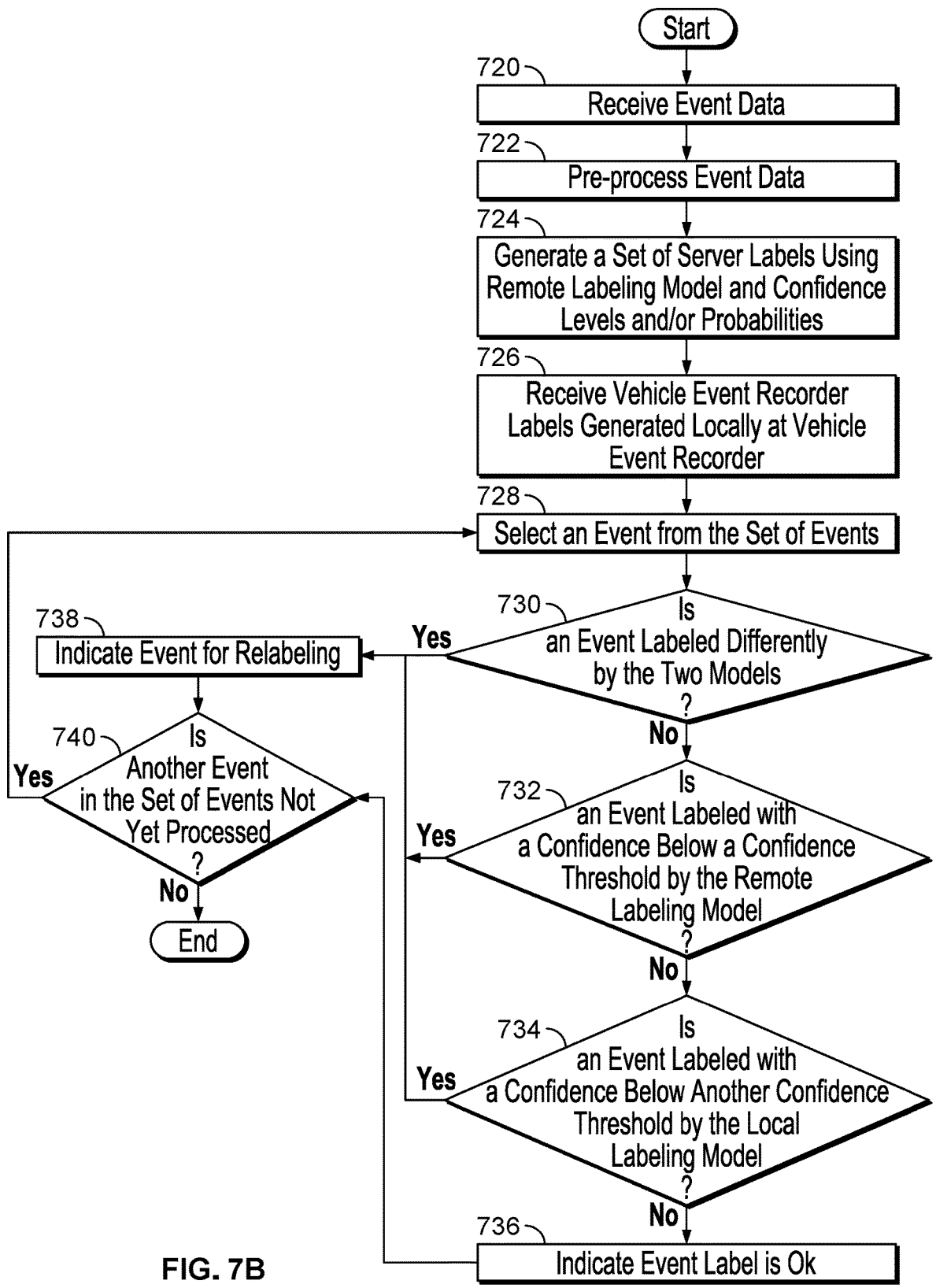
FIG. 7B is a flow diagram illustrating an embodiment of a process for relabeling an event label remotely at a vehicle data server.

FIG. 7B is a flow diagram illustrating an embodiment of a process for relabeling an event label remotely at a vehicle data server. In some embodiments, the process of FIG. 7B is executed by a vehicle data server processor (e.g., vehicle data server processor 304 of FIG. 3). In the example shown, in 720, event data is received. For example, video data from one or more vehicle events is received. In 722, event data is pre-processed. For example, video data is filtered, decimated, cropped, resized, and/or normalized. In some embodiments, video data is filtered for vehicle event recorder identity, quality level, driver side, driver identity, date range, etc. In 724, a set of server labels is generated using a remote labeling model and confidence levels and/or probabilities. For example, a set of server labels is generated using a labeling model resident in the vehicle data server and confidence levels and/or probabilities for each label in the set of labels are also generated (e.g., by the vehicle data server processor).

In 726, vehicle event recorder labels generated locally at a vehicle event recorder are received. In 728, an event is selected from the set of events. For example, a vehicle event that comprises an internal or external driver event (e.g., what the driver's behavior is while driving, or how the driver interacts with the road, traffic, obstacles, pedestrians, etc.). In 730, it is determined whether an event is labeled differently by the two models. For example, it is determined whether an event is labeled differently by the local label model of the vehicle event recorder as compared to the remote labeling model of the vehicle data server. In some embodiments, the two models are identical (e.g., as a quality check to compare the model performance between the model running on the vehicle event recorder processor and the model running on the vehicle data server processor). In response to the event being labeled differently by the two models, in 738, the event is indicated for relabeling. For example, the video event (e.g., the video frames from a video clip that has recorded a vehicle event) is marked with an index or other appropriate fiducial marking to indicate to a set of reviewers that the event is in need of review. In response to the event not being labeled differently by the two models, control passes to 732.

In 732, it is determined whether an event is labeled with a confidence below a confidence threshold by the remote labeling model (e.g., 0.6, 0.5, 0.4, 0.3, etc.). For example, it is determined whether the event label is deemed unreliable and unlikely based on a confidence threshold associated with the remote labeling model. In response to the event being labeled with a confidence below a confidence threshold by the remote labeling model, in 738, the event is indicated for relabeling. In response to the event not being labeled with a confidence below a confidence threshold by the remote labeling model, control passes to 734.

In 734, it is determined whether an event is labeled with a confidence below another confidence threshold by the local labeling model (e.g., 0.6, 0.5, 0.4, 0.3, etc.). For example, it is determined whether the event label is deemed unreliable and unlikely based on a confidence threshold associated with the local labeling model. In response to the event being labeled with a confidence below a confidence threshold by the local labeling model, in 738, the event is indicated for relabeling, and the process passes to 740. In response to the event not being labeled with a confidence below a confidence threshold by the local labeling model, in 736, the event label is indicated as OK, and the process passes to 740.

In 740, it is determined whether there is another event in the set of events not yet processed. In response to there being another event in the set of events not yet processed, control passes to 728. In response to there not being another event in the set of events not yet processed, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for updating training data, comprising:
an interface configured to receive a set of vehicle data, wherein the set of vehicle data includes images and assigned labels associated with the images;
a processor;
a memory coupled with the processor, wherein the memory is configured to provide the processor with instructions which when executed cause the processor to:
determine a set of training data and a set of test data from the set of vehicle data;
train a model with the set of training data;
determine a set of predicted labels for the set of vehicle data using the model;
identify a set of potential mislabeled data using the set of predicted labels and the assigned labels; and determine an updated set of training data by relabeling the set of potential mislabeled data and replacing the set of potential mislabeled data with a relabeled set of data.

2. The system of claim 1, wherein the processor is further configured to retrain the model using the updated set of training data.

3. The system of claim 1, wherein identifying a potential mislabeled data comprises determining whether a predicted label probability is greater than a first confidence level and a predicted label is different from an assigned label.

4. The system of claim 1, wherein identifying a potential mislabeled data comprises determining whether a predicted label probability is less than a second confidence level and a predicted label is identical to an assigned label.

5. The system of claim 1, wherein determining the set of training data comprises:
    determining a filtered set of training data from the set of vehicle data; and
    determining the set of training data from the filtered set of training data.

6. The system of claim 5, wherein the filtered set of training data comprises the set of training data filtered based at least in part on whether image quality is above an image quality threshold.

7. The system of claim 6, wherein the image quality threshold comprises an uncompressed image quality threshold.

8. The system of claim 5, wherein the filtered set of training data comprises the set of training data filtered based at least in part on whether a driver seating position corresponds to right-side road driving.

9. The system of claim 5, wherein the filtered set of training data comprises the set of training data filtered based at least in part on whether date of training data is within a date range.

10. The system of claim 5, wherein training the model includes performing a test of the model using the set of test data.

11. A method for updating training data, comprising:
    receiving a set of vehicle data, wherein the set of vehicle data includes images and assigned labels associated with the images;
    determining, using a processor, a set of training data and a set of test data from the set of vehicle data;
    training a model with the set of training data;
    determining a set of predicted labels for the set of vehicle data using the model;
    identifying a set of potential mislabeled data using the set of predicted labels and the assigned labels; and
    determining an updated set of training data by relabeling the set of potential mislabeled data and replacing the set of potential mislabeled data with a relabeled set of data.

12. A computer program product for video processing, the computer program product being embodied in a non-transitory computer readable storage medium and comprising computer instructions for:
    receiving a set of vehicle data, wherein the set of vehicle data includes images and assigned labels associated with the images;
    determining, using a processor, a set of training data and a set of test data from the set of vehicle data;
    training a model with the set of training data;
    determining a set of predicted labels for the set of vehicle data using the model;
    identifying a set of potential mislabeled data using the set of predicted labels and the assigned labels; and
    determining an updated set of training data by relabeling the set of potential mislabeled data and replacing the set of potential mislabeled data with a relabeled set of data.

* * * * *